United States Patent [19]

Kneissl et al.

[11] 4,121,541

[45] Oct. 24, 1978

[54] PROCESS FOR PURIFYING FLUE GASES

[75] Inventors: Hannes Kneissl; Alexander Uebbing, both of Saarbrucken, Fed. Rep. of Germany

[73] Assignee: Saarbergwerke Aktiengesellschaft, Saarbrucken, Fed. Rep. of Germany

[21] Appl. No.: 782,071

[22] Filed: Mar. 28, 1977

[30] Foreign Application Priority Data

Mar. 27, 1976 [DE] Fed. Rep. of Germany ....... 2613205
Mar. 8, 1977 [DE] Fed. Rep. of Germany ....... 2709900

[51] Int. Cl.² ............................................. F22B 33/18
[52] U.S. Cl. ....................................... 122/1 R; 55/85; 55/89; 55/222; 55/257 HE; 55/269; 261/151; 261/161; 261/DIG. 77
[58] Field of Search ................. 55/80, 84, 85, 89, 222, 55/228, 257 HE, 269; 261/DIG. 9, DIG. 77, 151, 161; 60/39.5, 39.57, 39.59; 110/119; 122/1 R

[56] References Cited

U.S. PATENT DOCUMENTS

| | | | |
|---|---|---|---|
| 3,011,966 | 12/1961 | Jahentz et al. | 55/85 |
| 3,320,906 | 5/1967 | Domahidy | 110/119 |
| 3,613,333 | 10/1971 | Gardenier | 55/89 |
| 3,666,246 | 5/1972 | Cohen | 261/DIG. 77 |
| 3,789,804 | 2/1974 | Aguet | 122/1 R |
| 3,792,572 | 2/1974 | Turbin | 55/269 |
| 3,800,505 | 4/1974 | Traues, Jr. | 55/222 |
| 4,036,606 | 7/1977 | Lenk et al. | 55/85 |

*Primary Examiner*—Frank W. Lutter
*Assistant Examiner*—David L. Lacey
*Attorney, Agent, or Firm*—M. Ted Raptes

[57] ABSTRACT

A process is provided for removing pollutants from flue gases generated in a steam generating power plant. The flue gases are partially cooled and directly contacted with a portion of the cooling water of a circulating cooling water system used to remove waste heat of the generated steam in a waste heat condenser. The pollutants are thereby washed out of the flue gases into the cooling water and thereafter removed from the cooling water. The heat exchange of the cooling water and the flue gases can take place in a cooling tower, wherein ambient cooling air is drawn in to cool the circulating cooling water. The flue gases can also be further cooled prior to the direct washing thereof by indirect heat exchange in the cooling tower with said upwardly moving cooling air and washed flue gases.

6 Claims, 1 Drawing Figure

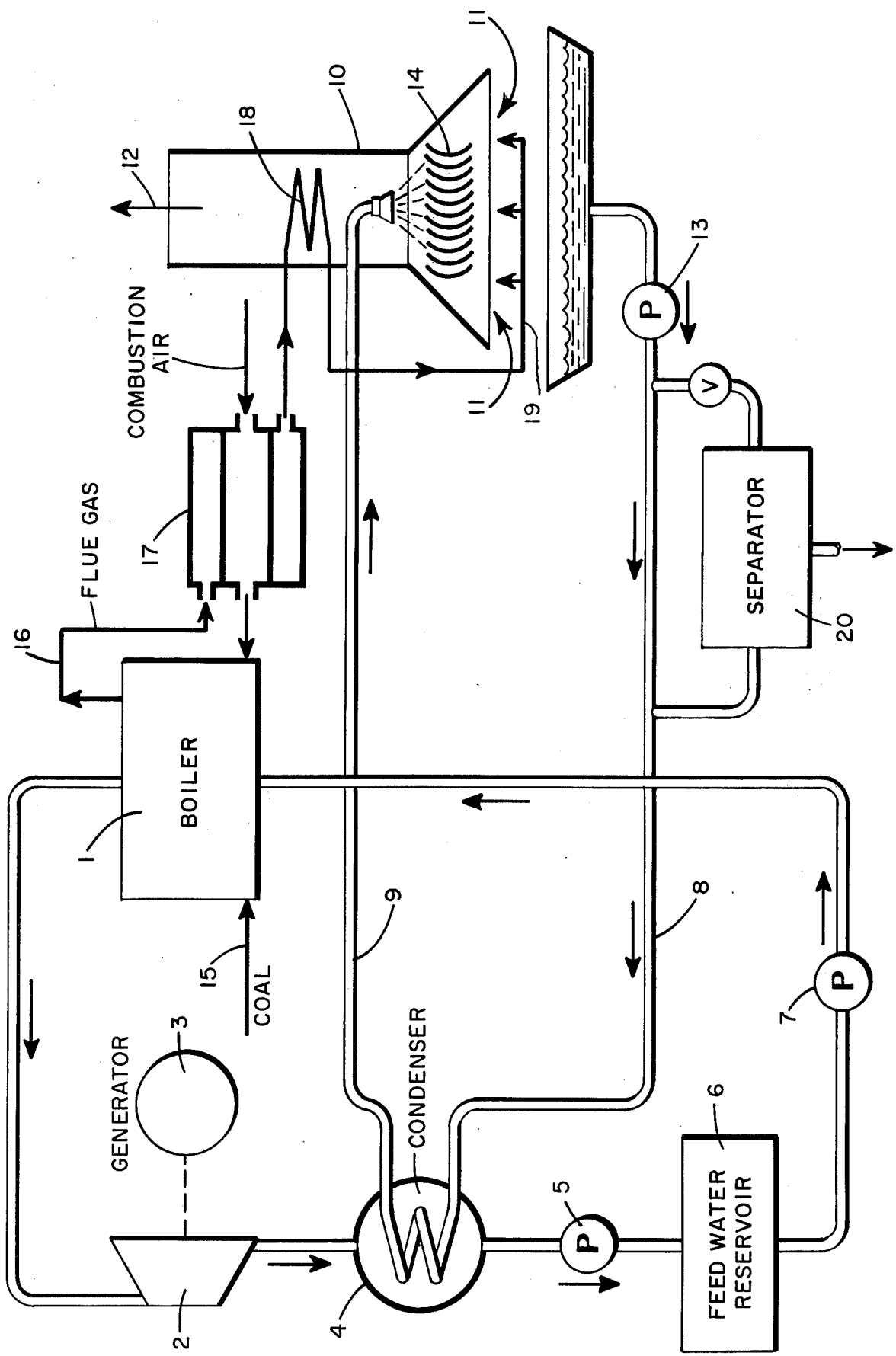

PROCESS FOR PURIFYING FLUE GASES

BACKGROUND OF THE INVENTION

The invention relates to a process for purifying the flue gas from steam generating power plant, wherein the waste heat produced therein is removed by means of a circulating water system.

During the combustion of coal or other fuels in power plants, flue gases are formed which are contaminated with many harmful components such as dust, soot, sulfur dioxide, fluorine compounds, nitrogen oxides, etc. These flue gases can cause considerable pollution if released into the atmosphere without being purified. In order to control pollution of the atmosphere, flue gases are conventionally subjected to a wet purification system comprising a washing zone wherein a water washing agent is used prior to their release into the atmosphere. This type of system requires large capital investments because of the required water circuits, washing zone equipment, and all secondary assemblies such as pumps, valves, etc.

SUMMARY OF THE INVENTION

It is an object of this invention to provide a process for purifying flue gases from a steam generating power plant wherein the flue gases are subjected to a washing procedure using circulating water of the system used for waste heat removal.

It is a further object of this invention to provide a process for purifying flue gases from a steam generating power plant wherein the equipment and costs required for purification of the flue gases is reduced.

Within a steam generating power plant according to the present invention, wherein the waste heat of the steam is removed by means of circulating water system, the foregoing object is achieved by using at least part of the water of the circulating water system for washing the harmful components out of the flue gases.

By using the process according to the present invention, the necessary investment and thus the cost for purifying the flue gases of a steam generating power plant can be lowered considerably. The expensive installation of a duplicate circulating system which would be utilized only for purifying purposes, is unnecessary because a portion of the cooling water utilized for removing the waste heat is additionally used as the washing agent for the washing of the flue gases.

DETAILED DESCRIPTION OF THE INVENTION

The process according to the present invention is especially advantageous in connection with steam generating power plants, wherein the waste heat of the steam produced is transferred to a cooling water system and is then passed to the outer atmosphere by means of direct heat exchange with ambient cooling air. In such a case, washing of the flue gases can be also obtained during this heat exchange, by thoroughly contacting the flue gases and the cooling air together with the cooling water. Thereby most of the impurities which are present in the flue gases are absorbed by the cooling water. In this manner the purified flue gases can be released into the atmosphere together with the cooling air without causing additional pollution. Within power plants wherein the direct heat exchange between the cooling water and the cooling air is effected in a cooling tower, the washing of the flue gases can be accomplshed directly in a lower portion of the cooling tower by directing the flue gases together with the cooling air upwardly towards the trickling downwardly flowing water. Such cooling towers are especially suitable for washing the flue gases.

The mechanical features which are provided for improving the heat exchange between the cooling water, which is trickling downwardly, and in the ambient cooling air, which is moving upwardly, also improve the exchange of harmful components between the flue gases and the cooling water. The portion of the cooling tower which is intended for repeated cooling of the cooling water also constitutes a highly effective device which is advantageously used for washing the flue gases of the power plant according to the present invention.

According to a further embodiment of the invention, it is preferable to cool the flue gases to the ambient atmosphere temperature to avoid any heating of the cooling water during the washing of the flue gases. These flue gases have already been cooled to about 165° C. by heat exchange with the combustion air.

Preferably, the cooling of the flue gases is obtained within a heat exchanger, placed directly within the cooling tower, by indirect heat exchanger with the ambient cooling air moving upwardly within the cooling tower. Accordingly, an additional warming up of the nearly saturated cooling air is effected. As a result of this additional warming, the formation of steam clouds disagreeable to the surrounding atmosphere environment at the outflow of the cooling air from the cooling tower is advantageously reduced. Furthermore, the upward thrust of the cooling air within the cooling tower is increased by the additional heating, whereby more cooling air is drawn into the cooling tower per time unit and thus the overall cooling effect of the cooling tower is improved.

The invention will be better understood from the following working Example as illustrated in the schematic of the accompanying drawing.

The schematic drawing relates overall to a steam generating power plant, wherein high pressure steam is drawn from a boiler 1 and expanded in a turbine 2, and the energy derived therefrom operates a generator 3. The high pressure steam is condensed in a condenser 4 by heat exchange with cooling water of a cooling water system. The water formed in condenser 4 is transferred by means of a pump 5 into a feed water container 6, and then recycled into the boiler 1 by means of another pump 7.

The waste heat obtained in the condenser 4 is transferred to cooling water introduced into the condenser through a conduit 8 at a temperature of about 22° C. and is removed through conduit 9 at a temperature of about 30° C. The renewed cooling of the cooling water containing the waste heat to a temperature of about 22° C. is effected in a cooling tower 10, (shown schematically) by direct heat exchange with ambient atmosphere air flowing into the lower portion of the cooling tower through openings 11 and leaving the cooling tower at the top in the direction of the arrow 12. The cooling water streams through the lower portion of the cooling tower 10 in a downward direction, is cooled in the process by the upflowing ambient air and is recycled into the condenser 4 by means of a pump 13 and conduit 8. The heat exchange between the cooling water and the ambient air is advantageously improved by means of the internal fin structure 14 which extends the heat exchange surface area.

The generation of steam within the boiler 1 is obtained by the conventional combustion of coal in the combustion chamber (now shown) thereof. The coal is introduced through conduit 15 into the combustion chamber. Flue gases are formed during the combustion, which are contaminated with harmful components such as dust, soot, sulfur dioxide, fluorine compounds and nitrogen oxides. These flue gases are removed from the boiler 1 through a conduit 16 leading into a heat exchanger 17 and therein are cooled to about 165° C. by heat exchange with entering combustion air fed into the combustion chamber of the boiler.

Further cooling of the flue gases is obtained in a heat exchanger 18, placed directly in the cooling tower 10. Heat exchange of the flue gases is conducted therein with the upwardly flowing nearly saturated cooling air which has contacted the falling cooling water. The flue gases leaving the heat exchanger 18 are introduced into the lower portion of the cooling tower 10 through a conduit 19 and the combined ambient cooling air and flue gases are intensively contacted with the downwardly trickling cooling water. Accordingly, an intensive contact between the flue gas and the cooling water is effected, whereby nearly all contaminants present in the flue gas are absorbed by the cooling water. The substantially purified flue gas can be released together with ambient cooling air from the cooling tower 10 into the surrounding atmoshere in the direction of the arrow 12 without causing additional pollution.

The impurities transferred into the cooling water during the washing operation can be partially separated from the cooling water in a separator unit 20. If the flue gas contains large quantities of sulfur oxides leading to the formation of sulfur acids, in the cooling water, these sulfur compounds can be oxidized into sulfuric acid within the separating unit and then removed in the form of calcium sulfate from the cooling water by addition of calcium ions.

What is claimed is:

1. A process for removing pollutants contained in flue gases from a steam generating power plant wherein the waste heat of the generated steam is removed in a waste heat condenser, comprising removing said waste heat by indirect heat exhange contact in said condenser with cooling water from a circulating cooling water system, partially cooling said flue gases, directly contacting said partially cooled flue gases with said circulating cooling water which has passed through said condenser, whereby said pollutants are washed out of said flue gases and into said cooling water.

2. The process of claim 1 wherein said circulating cooling water is repeatedly cooled by direct heat exchange contact with ambient cooling air in a cooling tower concurrently with the said washing of said flue gases, and wherein said flue gases and said cooling air are introduced into the lower portion of said cooling tower.

3. The process of claim 1 wherein said step of partially cooling said flue gases comprises indirect heat exhange contact with ambient air, which is to be used as combustion air in said steam generating power plant, prior to washing of said flue gases.

4. The process of claim 1 wherein said step of partially cooling said flue gases comprises indirect heat exhange contact in a cooling tower with ambient cooling air flowing upwardly within said cooling tower prior to said washing of said flue gases.

5. The process of claim 1 wherein at least a portion of said pollutants, obtained from said flue gases and contained in said cooling water, are separated from said cooling water prior to recycling of said cooling water to said waste heat condenser.

6. The process of claim 1 wherein said step of partially cooling said flue gases comprises partially cooling said flue gases prior to washing thereof by indirect heat exhange contact with ambient cooling air used for combustion air in said steam generating power plant, and said gases are further cooled by indirect heat exhange contact in a cooling tower with ambient cooling air flowing upwardly within said tower, and said step of washing said flue gases comprises washing said gases in said tower subsequent to said further cooling by direct contact with said circulating cooling water.

* * * * *